US012572846B2

(12) United States Patent
Friedlander et al.

(10) Patent No.: US 12,572,846 B2
(45) Date of Patent: *Mar. 10, 2026

(54) SYSTEM AND METHOD FOR DEVICE ATTRIBUTE IDENTIFICATION BASED ON HOST CONFIGURATION PROTOCOLS

(71) Applicant: Armis Security Ltd., Tel Aviv-Jaffa (IL)

(72) Inventors: Yuval Friedlander, Petah-Tiqwa (IL); Gil Ben Zvi, Hod Hasharon (IL); Tom Hanetz, Tel Aviv (IL); Ron Shoham, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 828 days.

This patent is subject to a terminal disclaimer.

(21) Appl. No.: 17/655,845

(22) Filed: Mar. 22, 2022

(65) Prior Publication Data

US 2023/0306297 A1 Sep. 28, 2023

(51) Int. Cl.
*G06N 20/00* (2019.01)

(52) U.S. Cl.
CPC .................................... *G06N 20/00* (2019.01)

(58) Field of Classification Search
CPC .. G06N 20/00; H04L 63/0227; H04L 63/1425
See application file for complete search history.

(56) References Cited

U.S. PATENT DOCUMENTS

| | | | |
|---|---|---|---|
| 1,145,501 A | 7/1915 | More et al. | |
| 5,471,459 A | 11/1995 | Gut | |
| 6,363,489 B1 | 3/2002 | Comay et al. | |
| 6,754,321 B1 | 6/2004 | Innes et al. | |
| 7,165,240 B2 | 1/2007 | Patterson | |
| 7,346,338 B1 | 3/2008 | Calhoun et al. | |

(Continued)

FOREIGN PATENT DOCUMENTS

| | | |
|---|---|---|
| AU | 2019201137 A1 | 9/2019 |
| CA | 2326194 A1 | 8/2001 |

(Continued)

OTHER PUBLICATIONS

Hagos et al., "A Machine Learning Based Tool for Passive OS Fingerprinting With TCP Variant" (Year: 2021).*

(Continued)

*Primary Examiner* — Reji Kartholy
(74) *Attorney, Agent, or Firm* — Perkins Coie LLP

(57) ABSTRACT

A system and method for determining device attributes based on host configuration protocols. A method includes applying at least one machine learning model to a test data set extracted from host configuration protocol data including at least one test options sequence, wherein each test options sequence is an ordered series of options requested by a first device, wherein each of the at least one machine learning model is trained based on a train data set including a plurality of training options sequences and a plurality of device attributes, wherein each training options sequence and each device attribute of the train data set corresponds to a respective second device; and determining, based on the output of the at least one machine learning model, at least one device attribute for the first device.

13 Claims, 4 Drawing Sheets

(56) References Cited

U.S. PATENT DOCUMENTS

| | | | |
|---|---|---|---|
| 7,499,998 B2 | 3/2009 | Toebes et al. |
| 7,508,769 B1 | 3/2009 | Duffield et al. |
| 7,512,980 B2 | 3/2009 | Copeland et al. |
| 7,603,710 B2 | 10/2009 | Harvey et al. |
| 7,620,533 B2 | 11/2009 | Bolt et al. |
| 7,792,989 B2 | 9/2010 | Toebes et al. |
| 7,836,079 B2 | 11/2010 | Kumar et al. |
| 7,853,250 B2 | 12/2010 | Harvey et al. |
| 7,921,462 B2 | 4/2011 | Rooney et al. |
| 8,209,740 B1 | 6/2012 | Kulaga et al. |
| 8,254,286 B2 | 8/2012 | Nechushtan et al. |
| 8,307,430 B1 | 11/2012 | Chen et al. |
| 8,392,496 B2 | 3/2013 | Linden et al. |
| 8,434,148 B2 | 4/2013 | Teo |
| 8,468,244 B2 | 6/2013 | Redlich et al. |
| 8,468,606 B2 | 6/2013 | Van et al. |
| 8,504,818 B2 | 8/2013 | Rao et al. |
| 8,621,618 B1 | 12/2013 | Ramsey et al. |
| 8,639,800 B2 | 1/2014 | Friedrich et al. |
| 8,677,474 B2 | 3/2014 | Bostrom et al. |
| 8,732,732 B2 | 5/2014 | Meijer et al. |
| 8,744,987 B1 | 6/2014 | Forman et al. |
| 8,767,630 B1 | 7/2014 | Collins et al. |
| 8,836,536 B2 | 9/2014 | Marwah et al. |
| 8,875,255 B1 | 10/2014 | Dotan et al. |
| 8,972,539 B2 | 3/2015 | Carriere |
| 9,027,079 B2 | 5/2015 | Comay et al. |
| 9,031,087 B2 | 5/2015 | Petrovykh |
| 9,106,714 B2 | 8/2015 | Kumarasamy et al. |
| 9,135,293 B1 | 9/2015 | Kienzle et al. |
| 9,149,199 B2 | 10/2015 | Farazi |
| 9,154,516 B1 | 10/2015 | Vaystikh et al. |
| 9,154,982 B2 | 10/2015 | Chan et al. |
| 9,166,999 B1 | 10/2015 | Kulkarni et al. |
| 9,231,918 B2 | 1/2016 | Khan et al. |
| 9,253,282 B2 | 2/2016 | O'Donoghue et al. |
| 9,306,965 B1 | 4/2016 | Grossman et al. |
| 9,412,024 B2 | 8/2016 | Chaudhury et al. |
| 9,456,343 B1 | 9/2016 | Mihalache et al. |
| 9,503,463 B2 | 11/2016 | Karta et al. |
| 9,516,053 B1 | 12/2016 | Muddu et al. |
| 9,600,320 B2 | 3/2017 | Hamilton et al. |
| 9,635,049 B1 | 4/2017 | Oprea et al. |
| 9,692,775 B2 | 6/2017 | Zhang |
| 9,749,349 B1 | 8/2017 | Czarny et al. |
| 9,749,357 B2 | 8/2017 | Bailey et al. |
| 9,754,112 B1 | 9/2017 | Moritz et al. |
| 9,756,067 B2 | 9/2017 | Boyadjiev et al. |
| 9,756,403 B2 | 9/2017 | Proud |
| 9,894,093 B2 | 2/2018 | Maestas |
| 9,978,038 B2 | 5/2018 | Dhandapani et al. |
| 10,015,185 B1 | 7/2018 | Kolman et al. |
| 10,045,218 B1 | 8/2018 | Stapleton et al. |
| 10,063,434 B1 | 8/2018 | Khanal et al. |
| 10,091,312 B1 | 10/2018 | Khanwalkar et al. |
| 10,095,866 B2 | 10/2018 | Gong et al. |
| 10,104,101 B1 | 10/2018 | Thakar et al. |
| 10,187,369 B2 | 1/2019 | Caldera et al. |
| 10,187,401 B2 | 1/2019 | Machlica et al. |
| 10,291,635 B2 | 5/2019 | Muddu et al. |
| 10,313,383 B2 | 6/2019 | Sommer |
| 10,318,886 B2 | 6/2019 | Baradaran et al. |
| 10,320,619 B2 | 6/2019 | Seddigh et al. |
| 10,333,965 B2 | 6/2019 | Gathala et al. |
| 10,333,988 B2 | 6/2019 | Porras et al. |
| 10,380,348 B2 | 8/2019 | Cheng et al. |
| 10,395,262 B2 | 8/2019 | Faith et al. |
| 10,419,418 B2 | 9/2019 | Grajek et al. |
| 10,419,931 B1 | 9/2019 | Sohail et al. |
| 10,498,755 B2 | 12/2019 | Harris et al. |
| 10,498,758 B1 | 12/2019 | Schwartz et al. |
| 10,505,967 B1 | 12/2019 | Schwartz et al. |
| 10,511,620 B2 | 12/2019 | Schwartz et al. |
| 10,567,243 B2 | 2/2020 | Tippenhauer et al. |
| 10,594,732 B2 | 3/2020 | Amit et al. |
| 10,623,289 B1 | 4/2020 | Mccorkendale et al. |
| 10,623,408 B1 | 4/2020 | Marshall et al. |
| 10,623,426 B1 | 4/2020 | Yumer et al. |
| 10,686,816 B1 | 6/2020 | Shintre et al. |
| 10,699,018 B2 | 6/2020 | Hamby |
| 10,708,291 B2 | 7/2020 | Findlay |
| 10,735,456 B2 | 8/2020 | Crabtree et al. |
| 10,771,498 B1 | 9/2020 | Tamhane et al. |
| 10,831,994 B2 | 11/2020 | Iyengar |
| 10,887,218 B2 | 1/2021 | Williams et al. |
| 10,909,470 B2 | 2/2021 | Pietrobon et al. |
| 10,924,503 B1 | 2/2021 | Pereira et al. |
| 10,979,848 B1 | 4/2021 | Palappetty et al. |
| 11,006,920 B2 | 5/2021 | Shah |
| 11,050,679 B1 | 6/2021 | Przygienda et al. |
| 11,057,393 B2 | 7/2021 | Coffing |
| 11,074,508 B2 | 7/2021 | Zhu et al. |
| 11,080,109 B1 | 8/2021 | Poirel et al. |
| 11,102,082 B1 | 8/2021 | Sarel et al. |
| 11,102,233 B2 | 8/2021 | Schwartz et al. |
| 11,164,236 B1 | 11/2021 | Ross et al. |
| 11,190,641 B1 | 11/2021 | Shukla et al. |
| 11,240,064 B2 | 2/2022 | Rubenstein et al. |
| 11,277,426 B1 | 3/2022 | Kazemeyni |
| 11,363,031 B2 | 6/2022 | Carnes et al. |
| 11,363,051 B2 | 6/2022 | Izrael et al. |
| 11,399,023 B2 | 7/2022 | Vasseur et al. |
| 11,455,501 B2 | 9/2022 | Paula et al. |
| 11,481,503 B2 | 10/2022 | Gitelman et al. |
| 11,489,847 B1 | 11/2022 | Uplinger et al. |
| 11,496,391 B1 | 11/2022 | Przygienda et al. |
| 11,526,392 B2 | 12/2022 | Shoham et al. |
| 11,593,700 B1 | 2/2023 | Ansari et al. |
| 11,755,586 B2 | 9/2023 | Poirel et al. |
| 11,765,176 B2 | 9/2023 | Viswanath et al. |
| 11,777,965 B2 | 10/2023 | Du et al. |
| 11,824,877 B2 | 11/2023 | Friedlander et al. |
| 11,824,880 B2 | 11/2023 | Tomer et al. |
| 11,841,952 B2 | 12/2023 | Gitelman et al. |
| 11,956,252 B2 | 4/2024 | Gitelman et al. |
| 11,983,611 B2 | 5/2024 | Hanetz et al. |
| 12,015,634 B2 | 6/2024 | Izrael et al. |
| 12,026,248 B2 | 7/2024 | Shoham et al. |
| 12,052,274 B2 | 7/2024 | Friedlander et al. |
| 12,216,459 B2 | 2/2025 | Friedlander et al. |
| 12,223,406 B2 | 2/2025 | Hanetz et al. |
| 12,225,027 B2 | 2/2025 | Luk-Zilberman et al. |
| 12,328,327 B2 | 6/2025 | Friedlander et al. |
| 12,346,487 B2 | 7/2025 | Luk-Zilberman et al. |
| 12,373,567 B2 | 7/2025 | Gitelman et al. |
| 12,375,481 B2 | 7/2025 | Sarel et al. |
| 12,381,896 B2 | 8/2025 | Gitelman et al. |
| 12,386,947 B2 | 8/2025 | Shoham et al. |
| 12,388,855 B2 | 8/2025 | Friedlander et al. |
| 2001/0048661 A1 | 12/2001 | Clear et al. |
| 2002/0078381 A1 | 6/2002 | Farley et al. |
| 2003/0187584 A1 | 10/2003 | Harris |
| 2003/0217024 A1 | 11/2003 | Kocher |
| 2004/0049699 A1 | 3/2004 | Griffith et al. |
| 2004/0064480 A1 | 4/2004 | Bartlett et al. |
| 2004/0123091 A1 | 6/2004 | Das |
| 2005/0002025 A1 | 1/2005 | Goto et al. |
| 2005/0160480 A1 | 7/2005 | Birt et al. |
| 2005/0188215 A1 | 8/2005 | Shulman et al. |
| 2005/0188241 A1 | 8/2005 | Cabezas et al. |
| 2005/0198380 A1 | 9/2005 | Panasyuk et al. |
| 2005/0209519 A1 | 9/2005 | Krishnan et al. |
| 2006/0026273 A1 | 2/2006 | Comay et al. |
| 2006/0026682 A1 | 2/2006 | Zakas |
| 2006/0156402 A1 | 7/2006 | Stone et al. |
| 2006/0265746 A1 | 11/2006 | Farley et al. |
| 2007/0142030 A1 | 6/2007 | Sinha et al. |
| 2007/0209074 A1 | 9/2007 | Coffman |
| 2007/0209075 A1 | 9/2007 | Coffman |
| 2007/0288185 A1 | 12/2007 | Burch et al. |
| 2008/0039058 A1 | 2/2008 | Ray |
| 2008/0072285 A1 | 3/2008 | Sankaran et al. |
| 2008/0086776 A1 | 4/2008 | Tuvell et al. |
| 2008/0126286 A1 | 5/2008 | Machani |

(56) References Cited

U.S. PATENT DOCUMENTS

| | | |
|---|---|---|
| 2008/0200181 A1 | 8/2008 | Zill et al. |
| 2008/0271143 A1 | 10/2008 | Stephens et al. |
| 2008/0289027 A1 | 11/2008 | Yariv et al. |
| 2009/0138590 A1 | 5/2009 | Lee et al. |
| 2009/0172821 A1 | 7/2009 | Daira et al. |
| 2009/0235354 A1 | 9/2009 | Gray et al. |
| 2010/0023604 A1 | 1/2010 | Verma et al. |
| 2010/0081411 A1 | 4/2010 | Montenero |
| 2010/0125903 A1 | 5/2010 | Devarajan et al. |
| 2010/0274924 A1 | 10/2010 | Allan et al. |
| 2011/0046920 A1 | 2/2011 | Amis |
| 2011/0154497 A1 | 6/2011 | Bailey, Jr. |
| 2011/0251960 A1 | 10/2011 | Holla et al. |
| 2011/0258703 A1 | 10/2011 | Ramcharran |
| 2012/0072983 A1 | 3/2012 | Mccusker et al. |
| 2012/0096558 A1 | 4/2012 | Evrard |
| 2012/0150490 A1 | 6/2012 | Oyabu et al. |
| 2012/0185563 A1 | 7/2012 | Sugiyama et al. |
| 2013/0011030 A1 | 1/2013 | Tzoumas et al. |
| 2013/0042029 A1 | 2/2013 | Lu et al. |
| 2013/0067582 A1 | 3/2013 | Donovan et al. |
| 2013/0074143 A1 | 3/2013 | Bu et al. |
| 2013/0096980 A1 | 4/2013 | Basavapatna et al. |
| 2013/0097699 A1 | 4/2013 | Balupari et al. |
| 2013/0097711 A1 | 4/2013 | Basavapatna et al. |
| 2013/0127618 A1 | 5/2013 | Sheleheda et al. |
| 2013/0167196 A1 | 6/2013 | Spencer et al. |
| 2013/0179988 A1 | 7/2013 | Bekker et al. |
| 2013/0191919 A1 | 7/2013 | Basavapatna et al. |
| 2013/0227689 A1 | 8/2013 | Pietrowicz et al. |
| 2013/0239177 A1 | 9/2013 | Sigurdson et al. |
| 2013/0246088 A1 | 9/2013 | Huster et al. |
| 2013/0247194 A1 | 9/2013 | Jha et al. |
| 2013/0298230 A1 | 11/2013 | Kumar et al. |
| 2013/0340084 A1 | 12/2013 | Schrecker et al. |
| 2014/0032650 A1 | 1/2014 | Singh et al. |
| 2014/0173738 A1 | 6/2014 | Condry et al. |
| 2014/0215195 A1 | 7/2014 | Colbert et al. |
| 2014/0237545 A1 | 8/2014 | Mylavarapu et al. |
| 2014/0241373 A1 | 8/2014 | Pasam et al. |
| 2014/0247728 A1 | 9/2014 | Amitai et al. |
| 2014/0270347 A1 | 9/2014 | Xu et al. |
| 2014/0282905 A1 | 9/2014 | Iyer et al. |
| 2014/0283029 A1 | 9/2014 | Chandrasekaran et al. |
| 2014/0317270 A1 | 10/2014 | Besehanic |
| 2015/0009995 A1 | 1/2015 | Gross et al. |
| 2015/0052595 A1 | 2/2015 | Murphy |
| 2015/0067865 A1 | 3/2015 | Seacat et al. |
| 2015/0113133 A1 | 4/2015 | Srinivas et al. |
| 2015/0128236 A1 | 5/2015 | Moscicki et al. |
| 2015/0128274 A1 | 5/2015 | Giokas |
| 2015/0163121 A1 | 6/2015 | Mahaffey et al. |
| 2015/0163242 A1 | 6/2015 | Laidlaw et al. |
| 2015/0199913 A1* | 7/2015 | Mayfield ................ G09B 7/02 |
| | | 434/353 |
| 2015/0200827 A1 | 7/2015 | Agarwal et al. |
| 2015/0207811 A1 | 7/2015 | Feher et al. |
| 2015/0229664 A1 | 8/2015 | Hawthorn et al. |
| 2015/0271200 A1 | 9/2015 | Brady et al. |
| 2015/0288744 A1 | 10/2015 | Dwan et al. |
| 2015/0295943 A1 | 10/2015 | Malachi |
| 2015/0326601 A1 | 11/2015 | Grondin et al. |
| 2015/0339912 A1 | 11/2015 | Farrand et al. |
| 2015/0346066 A1 | 12/2015 | Dutta et al. |
| 2015/0350228 A1 | 12/2015 | Baxley et al. |
| 2015/0350902 A1 | 12/2015 | Baxley et al. |
| 2015/0356421 A1 | 12/2015 | Jones et al. |
| 2015/0373043 A1 | 12/2015 | Wang et al. |
| 2015/0373483 A1 | 12/2015 | Verma et al. |
| 2015/0379371 A1 | 12/2015 | Yoon et al. |
| 2016/0044054 A1 | 2/2016 | Stiansen et al. |
| 2016/0050182 A1 | 2/2016 | Edross |
| 2016/0078229 A1 | 3/2016 | Gong et al. |
| 2016/0088000 A1 | 3/2016 | Siva Kumar et al. |
| 2016/0094578 A1 | 3/2016 | Mcquillan et al. |
| 2016/0099963 A1 | 4/2016 | Mahaffey et al. |
| 2016/0112878 A1 | 4/2016 | Kaushik |
| 2016/0127417 A1 | 5/2016 | Janssen |
| 2016/0127777 A1 | 5/2016 | Roberts et al. |
| 2016/0134588 A1 | 5/2016 | Falkowitz et al. |
| 2016/0173521 A1 | 6/2016 | Yampolskiy et al. |
| 2016/0191559 A1 | 6/2016 | Mhatre et al. |
| 2016/0203316 A1 | 7/2016 | Mace et al. |
| 2016/0219067 A1 | 7/2016 | Han et al. |
| 2016/0226911 A1 | 8/2016 | Boss et al. |
| 2016/0232358 A1 | 8/2016 | Grieco et al. |
| 2016/0253069 A1 | 9/2016 | Zapletal |
| 2016/0277427 A1 | 9/2016 | Deshpande et al. |
| 2016/0294854 A1 | 10/2016 | Parthasarathi et al. |
| 2016/0300266 A1 | 10/2016 | Smalley et al. |
| 2016/0308898 A1 | 10/2016 | Teeple et al. |
| 2016/0359872 A1 | 12/2016 | Yadav et al. |
| 2016/0359887 A1 | 12/2016 | Yadav et al. |
| 2016/0359915 A1 | 12/2016 | Gupta et al. |
| 2016/0366040 A1 | 12/2016 | Nampelly et al. |
| 2016/0366155 A1 | 12/2016 | El-Moussa et al. |
| 2016/0380989 A1 | 12/2016 | Bailey et al. |
| 2017/0034161 A1 | 2/2017 | Isola et al. |
| 2017/0046510 A1 | 2/2017 | Chen et al. |
| 2017/0046519 A1 | 2/2017 | Cam |
| 2017/0048270 A1 | 2/2017 | Boyadjiev et al. |
| 2017/0063906 A1 | 3/2017 | Muddu et al. |
| 2017/0063912 A1 | 3/2017 | Muddu et al. |
| 2017/0063922 A1 | 3/2017 | Ibatullin et al. |
| 2017/0070380 A1 | 3/2017 | Bajpai et al. |
| 2017/0070419 A1 | 3/2017 | Singhal et al. |
| 2017/0070517 A1 | 3/2017 | Bailey et al. |
| 2017/0070523 A1 | 3/2017 | Bailey et al. |
| 2017/0078322 A1 | 3/2017 | Seiver et al. |
| 2017/0083307 A1 | 3/2017 | Aleksandrov et al. |
| 2017/0084269 A1 | 3/2017 | Shi et al. |
| 2017/0090499 A1 | 3/2017 | Dolan |
| 2017/0111813 A1* | 4/2017 | Townend .............. H04W 24/04 |
| 2017/0124478 A1 | 5/2017 | Baradaran et al. |
| 2017/0150939 A1 | 6/2017 | Shah |
| 2017/0180384 A1 | 6/2017 | Malenfant et al. |
| 2017/0208079 A1 | 7/2017 | Cammarota et al. |
| 2017/0214701 A1 | 7/2017 | Hasan |
| 2017/0220801 A1 | 8/2017 | Stockdale et al. |
| 2017/0223037 A1 | 8/2017 | Singh et al. |
| 2017/0244746 A1 | 8/2017 | Hawthorn et al. |
| 2017/0250855 A1 | 8/2017 | Patil et al. |
| 2017/0250979 A1 | 8/2017 | Benson et al. |
| 2017/0257363 A1 | 9/2017 | Franke et al. |
| 2017/0264644 A1 | 9/2017 | Mihan et al. |
| 2017/0272460 A1 | 9/2017 | Rusakov et al. |
| 2017/0279829 A1 | 9/2017 | Vasseur et al. |
| 2017/0289187 A1 | 10/2017 | Noel et al. |
| 2017/0324651 A1 | 11/2017 | Penno et al. |
| 2017/0332238 A1 | 11/2017 | Bansal et al. |
| 2017/0339180 A1 | 11/2017 | Klein et al. |
| 2017/0353491 A1 | 12/2017 | Gukal et al. |
| 2017/0353498 A1 | 12/2017 | Huang et al. |
| 2017/0353499 A1 | 12/2017 | Huang et al. |
| 2017/0372232 A1 | 12/2017 | Maughan et al. |
| 2018/0004948 A1 | 1/2018 | Martin et al. |
| 2018/0032997 A1 | 2/2018 | Gordon et al. |
| 2018/0039789 A1 | 2/2018 | Sanchez |
| 2018/0048534 A1 | 2/2018 | Banga et al. |
| 2018/0048666 A1 | 2/2018 | Alderson |
| 2018/0054455 A1 | 2/2018 | Bercovich et al. |
| 2018/0096260 A1 | 4/2018 | Zimmer et al. |
| 2018/0097775 A1 | 4/2018 | Obaidi |
| 2018/0097840 A1 | 4/2018 | Murthy |
| 2018/0124091 A1 | 5/2018 | Sweeney et al. |
| 2018/0124093 A1 | 5/2018 | Schwartz et al. |
| 2018/0124096 A1 | 5/2018 | Schwartz et al. |
| 2018/0129663 A1 | 5/2018 | Ivanov et al. |
| 2018/0137287 A1 | 5/2018 | Han et al. |
| 2018/0144139 A1 | 5/2018 | Cheng et al. |
| 2018/0181749 A1 | 6/2018 | Kolacinski et al. |
| 2018/0191593 A1 | 7/2018 | De Knijf et al. |
| 2018/0198812 A1 | 7/2018 | Christodorescu et al. |
| 2018/0225592 A1 | 8/2018 | Ponnuswamy |

(56) References Cited

U.S. PATENT DOCUMENTS

| | | |
|---|---|---|
| 2018/0247312 A1 | 8/2018 | Loganathan et al. |
| 2018/0260214 A1 | 9/2018 | Oberheide et al. |
| 2018/0270229 A1 | 9/2018 | Zhang et al. |
| 2018/0288045 A1 | 10/2018 | Karunakaran et al. |
| 2018/0307943 A1 | 10/2018 | Savkli et al. |
| 2018/0309747 A1 | 10/2018 | Sweet et al. |
| 2018/0324193 A1 | 11/2018 | Ronen et al. |
| 2018/0330257 A1 | 11/2018 | Dodson et al. |
| 2018/0332069 A1 | 11/2018 | Moore et al. |
| 2018/0351987 A1 | 12/2018 | Patel et al. |
| 2018/0359278 A1 | 12/2018 | Rusakov et al. |
| 2018/0365397 A1 | 12/2018 | Viscarola et al. |
| 2018/0367548 A1 | 12/2018 | Stokes et al. |
| 2019/0014137 A1 | 1/2019 | Du et al. |
| 2019/0020641 A1 | 1/2019 | Wasily et al. |
| 2019/0020670 A1 | 1/2019 | Brabec et al. |
| 2019/0034413 A1 | 1/2019 | Rosewell et al. |
| 2019/0036688 A1 | 1/2019 | Wasily et al. |
| 2019/0052554 A1 | 2/2019 | Mukerji et al. |
| 2019/0057378 A1 | 2/2019 | Rudnick et al. |
| 2019/0065736 A1 | 2/2019 | Dharmadhikari et al. |
| 2019/0075013 A1 | 3/2019 | Garcia et al. |
| 2019/0081922 A1 | 3/2019 | Vilenski et al. |
| 2019/0095587 A1 | 3/2019 | Warner et al. |
| 2019/0097907 A1 | 3/2019 | Nickolov et al. |
| 2019/0102361 A1 | 4/2019 | Muralidharan et al. |
| 2019/0102698 A1 | 4/2019 | Roberts et al. |
| 2019/0108443 A1 | 4/2019 | Dwarakanath et al. |
| 2019/0109820 A1 | 4/2019 | Clark et al. |
| 2019/0114360 A1 | 4/2019 | Garg et al. |
| 2019/0116193 A1 | 4/2019 | Wang et al. |
| 2019/0124045 A1 | 4/2019 | Zong et al. |
| 2019/0132205 A1 | 5/2019 | Du et al. |
| 2019/0132286 A1 | 5/2019 | Holla et al. |
| 2019/0132344 A1 | 5/2019 | Lem et al. |
| 2019/0140994 A1 | 5/2019 | Snider et al. |
| 2019/0156042 A1 | 5/2019 | Kim et al. |
| 2019/0156198 A1 | 5/2019 | Mars et al. |
| 2019/0163598 A1 | 5/2019 | Harutyunyan et al. |
| 2019/0166141 A1 | 5/2019 | Xu et al. |
| 2019/0180193 A1 | 6/2019 | Sinha et al. |
| 2019/0182278 A1 | 6/2019 | Das et al. |
| 2019/0190952 A1 | 6/2019 | Cherry |
| 2019/0215380 A1 | 7/2019 | Rykowski et al. |
| 2019/0215688 A1 | 7/2019 | Zavesky et al. |
| 2019/0216350 A1 | 7/2019 | Sullivan et al. |
| 2019/0217191 A1 | 7/2019 | Colenbrander |
| 2019/0238584 A1 | 8/2019 | Somasundaram et al. |
| 2019/0253455 A1 | 8/2019 | Xuan |
| 2019/0258807 A1 | 8/2019 | Dimaggio et al. |
| 2019/0258953 A1 | 8/2019 | Lang et al. |
| 2019/0260784 A1 | 8/2019 | Stockdale et al. |
| 2019/0260796 A1 | 8/2019 | Amine |
| 2019/0260804 A1 | 8/2019 | Beck et al. |
| 2019/0266323 A1 | 8/2019 | Nguyen et al. |
| 2019/0266324 A1 | 8/2019 | Edwards et al. |
| 2019/0268355 A1 | 8/2019 | Nisbet et al. |
| 2019/0268775 A1 | 8/2019 | Mcdaid et al. |
| 2019/0288852 A1 | 9/2019 | Shetye et al. |
| 2019/0294485 A1 | 9/2019 | Kukreja et al. |
| 2019/0295000 A1 | 9/2019 | Candel et al. |
| 2019/0297402 A1 | 9/2019 | Anderson et al. |
| 2019/0301979 A1 | 10/2019 | Kawanoue et al. |
| 2019/0303710 A1 | 10/2019 | Saha et al. |
| 2019/0306731 A1 | 10/2019 | Raghuramu et al. |
| 2019/0318100 A1 | 10/2019 | Bhatia et al. |
| 2019/0335405 A1 | 10/2019 | Wang |
| 2019/0362076 A1 | 11/2019 | Wang et al. |
| 2019/0372934 A1 | 12/2019 | Yehudai et al. |
| 2019/0379699 A1 | 12/2019 | Katragadda et al. |
| 2019/0380037 A1 | 12/2019 | Lifshitz et al. |
| 2019/0381242 A1 | 12/2019 | Ambrosina et al. |
| 2019/0392152 A1 | 12/2019 | Patel et al. |
| 2019/0392351 A1 | 12/2019 | Zuluaga et al. |
| 2020/0007436 A1 | 1/2020 | Williams et al. |
| 2020/0028862 A1 | 1/2020 | Lin et al. |
| 2020/0051697 A1 | 2/2020 | Krishnamurti et al. |
| 2020/0065710 A1 | 2/2020 | Range et al. |
| 2020/0074084 A1 | 3/2020 | Dorrans et al. |
| 2020/0076853 A1 | 3/2020 | Pandian et al. |
| 2020/0092312 A1 | 3/2020 | Caldwell et al. |
| 2020/0097651 A1 | 3/2020 | Mestha et al. |
| 2020/0106795 A1 | 4/2020 | Servajean et al. |
| 2020/0106803 A1 | 4/2020 | Schwartz et al. |
| 2020/0112571 A1 | 4/2020 | Koral et al. |
| 2020/0112584 A1 | 4/2020 | Schwartz et al. |
| 2020/0120144 A1 | 4/2020 | Yadav et al. |
| 2020/0134510 A1 | 4/2020 | Basel et al. |
| 2020/0137102 A1 | 4/2020 | Sheridan et al. |
| 2020/0143061 A1 | 5/2020 | Kim et al. |
| 2020/0145287 A1 | 5/2020 | Savalle et al. |
| 2020/0151616 A1 | 5/2020 | Mermoud et al. |
| 2020/0177613 A1 | 6/2020 | Nilangekar et al. |
| 2020/0193234 A1 | 6/2020 | Pai et al. |
| 2020/0195508 A1 | 6/2020 | Benjamin |
| 2020/0195669 A1 | 6/2020 | Karasaridis et al. |
| 2020/0195679 A1 | 6/2020 | Du |
| 2020/0201620 A1 | 6/2020 | Beard |
| 2020/0210592 A1 | 7/2020 | Karas et al. |
| 2020/0210871 A1 | 7/2020 | Alperovich et al. |
| 2020/0222010 A1 | 7/2020 | Howard |
| 2020/0226257 A1 | 7/2020 | Maimon et al. |
| 2020/0242488 A1 | 7/2020 | Medas et al. |
| 2020/0242505 A1 | 7/2020 | Raz et al. |
| 2020/0244677 A1 | 7/2020 | Abbaszadeh et al. |
| 2020/0250530 A1 | 8/2020 | Shen |
| 2020/0272933 A1* | 8/2020 | Zhou ................... G06F 16/2465 |
| 2020/0280575 A1 | 9/2020 | Dean et al. |
| 2020/0285737 A1 | 9/2020 | Kraus et al. |
| 2020/0311557 A1 | 10/2020 | Jin et al. |
| 2020/0314134 A1 | 10/2020 | Izrael et al. |
| 2020/0322369 A1 | 10/2020 | Raghuramu et al. |
| 2020/0334228 A1 | 10/2020 | Matyska et al. |
| 2020/0364561 A1 | 11/2020 | Ananthanarayanan et al. |
| 2020/0364612 A1 | 11/2020 | Siravara et al. |
| 2020/0379868 A1 | 12/2020 | Dherange et al. |
| 2020/0382373 A1 | 12/2020 | Mermoud et al. |
| 2020/0382472 A1 | 12/2020 | Salin et al. |
| 2020/0382527 A1 | 12/2020 | Mitelman et al. |
| 2020/0382536 A1 | 12/2020 | Dherange et al. |
| 2020/0396129 A1 | 12/2020 | Tedaldi et al. |
| 2020/0403854 A1 | 12/2020 | Arunachalam et al. |
| 2020/0403991 A1 | 12/2020 | Sohail et al. |
| 2020/0409690 A1 | 12/2020 | Rouland et al. |
| 2020/0410403 A1 | 12/2020 | Kamulete |
| 2020/0412757 A1 | 12/2020 | Siddiq |
| 2021/0004409 A1 | 1/2021 | Zamora et al. |
| 2021/0029153 A1 | 1/2021 | Sugimoto et al. |
| 2021/0042570 A1 | 2/2021 | Iskandar et al. |
| 2021/0049270 A1 | 2/2021 | Urmanov et al. |
| 2021/0056404 A1 | 2/2021 | Goswami et al. |
| 2021/0058394 A1 | 2/2021 | Zhang et al. |
| 2021/0064593 A1 | 3/2021 | Yeddu |
| 2021/0065038 A1 | 3/2021 | Gu et al. |
| 2021/0067548 A1 | 3/2021 | Brandt et al. |
| 2021/0073658 A1 | 3/2021 | Poole et al. |
| 2021/0083983 A1 | 3/2021 | Chin et al. |
| 2021/0092094 A1 | 3/2021 | Kim et al. |
| 2021/0092095 A1 | 3/2021 | Kim et al. |
| 2021/0092117 A1 | 3/2021 | Zhang et al. |
| 2021/0092136 A1 | 3/2021 | Woodworth et al. |
| 2021/0097177 A1 | 4/2021 | Chistyakov et al. |
| 2021/0105613 A1 | 4/2021 | San et al. |
| 2021/0111990 A1 | 4/2021 | Nainar et al. |
| 2021/0112087 A1 | 4/2021 | Tassoumt et al. |
| 2021/0126931 A1 | 4/2021 | Babu et al. |
| 2021/0133346 A1 | 5/2021 | Alsharif et al. |
| 2021/0133538 A1 | 5/2021 | Troy et al. |
| 2021/0133602 A1 | 5/2021 | Amrani et al. |
| 2021/0160266 A1 | 5/2021 | Sternby et al. |
| 2021/0173760 A1 | 6/2021 | Downie et al. |
| 2021/0185058 A1 | 6/2021 | Gitelman et al. |
| 2021/0185083 A1 | 6/2021 | Azaria et al. |
| 2021/0203575 A1 | 7/2021 | Hanetz et al. |

(56) References Cited

U.S. PATENT DOCUMENTS

| | | |
|---|---|---|
| 2021/0203688 A1 | 7/2021 | Ghule et al. |
| 2021/0224687 A1 | 7/2021 | Goldszmidt et al. |
| 2021/0232291 A1 | 7/2021 | Abdulaal et al. |
| 2021/0250325 A1 | 8/2021 | Teflian et al. |
| 2021/0264035 A1 | 8/2021 | Gitelman et al. |
| 2021/0264036 A1 | 8/2021 | Gitelman et al. |
| 2021/0329029 A1 | 10/2021 | Vasseur et al. |
| 2021/0342207 A1 | 11/2021 | Oliveri et al. |
| 2021/0344695 A1 | 11/2021 | Palani et al. |
| 2021/0349774 A1 | 11/2021 | Shoham et al. |
| 2021/0365478 A1 | 11/2021 | Mopur et al. |
| 2021/0378577 A1 | 12/2021 | Sun et al. |
| 2021/0405984 A1 | 12/2021 | Agarwal et al. |
| 2022/0058347 A1 | 2/2022 | Singaraju et al. |
| 2022/0060449 A1 | 2/2022 | Head, Jr. et al. |
| 2022/0070183 A1 | 3/2022 | Goyal |
| 2022/0086071 A1 | 3/2022 | Sivaraman et al. |
| 2022/0086179 A1 | 3/2022 | Levin et al. |
| 2022/0138321 A1 | 5/2022 | Shrestha et al. |
| 2022/0138504 A1 | 5/2022 | Fathi et al. |
| 2022/0141178 A1 | 5/2022 | Suzuki |
| 2022/0150263 A1 | 5/2022 | Ricafort et al. |
| 2022/0150264 A1 | 5/2022 | Friedlander et al. |
| 2022/0188087 A1 | 6/2022 | Montag et al. |
| 2022/0191761 A1 | 6/2022 | Feng et al. |
| 2022/0210079 A1* | 6/2022 | Koren ..................... G06F 18/24 |
| 2022/0210190 A1 | 6/2022 | Weber et al. |
| 2022/0231993 A1 | 7/2022 | Sharma et al. |
| 2022/0239682 A1 | 7/2022 | Ben Zvi et al. |
| 2022/0247786 A1 | 8/2022 | Vavilala et al. |
| 2022/0255960 A1 | 8/2022 | Fainberg et al. |
| 2022/0263853 A1 | 8/2022 | Izrael et al. |
| 2022/0276931 A1 | 9/2022 | Chen et al. |
| 2022/0278984 A1 | 9/2022 | Sarel et al. |
| 2022/0311789 A1 | 9/2022 | Luk-Zilberman et al. |
| 2022/0327219 A1 | 10/2022 | Choi et al. |
| 2022/0327221 A1 | 10/2022 | Gitelman et al. |
| 2022/0391300 A1 | 12/2022 | Trapani et al. |
| 2022/0398307 A1 | 12/2022 | Shoham et al. |
| 2022/0414230 A1 | 12/2022 | Gitelman et al. |
| 2023/0004856 A1 | 1/2023 | Shoham et al. |
| 2023/0004857 A1 | 1/2023 | Shoham et al. |
| 2023/0011129 A1 | 1/2023 | Wuhib et al. |
| 2023/0014556 A1 | 1/2023 | Schuler et al. |
| 2023/0088415 A1 | 3/2023 | Friedlander et al. |
| 2023/0090050 A1 | 3/2023 | Kellner et al. |
| 2023/0143024 A1 | 5/2023 | Friedlander et al. |
| 2023/0216853 A1 | 7/2023 | Shoham et al. |
| 2023/0259802 A1 | 8/2023 | Klimov et al. |
| 2023/0300167 A1 | 9/2023 | Brecl |
| 2023/0336580 A1 | 10/2023 | Luk-Zilberman et al. |
| 2023/0344775 A1 | 10/2023 | Parekh et al. |
| 2023/0370334 A1 | 11/2023 | Mannengal et al. |
| 2023/0388106 A1 | 11/2023 | Craciun et al. |
| 2023/0394136 A1 | 12/2023 | Shoham et al. |
| 2023/0412626 A1 | 12/2023 | Wright |
| 2024/0015177 A1 | 1/2024 | Luk-Zilberman et al. |
| 2024/0078886 A1 | 3/2024 | Ghourchian et al. |
| 2024/0080299 A1 | 3/2024 | Kim |
| 2024/0089277 A1 | 3/2024 | Friedlander et al. |
| 2024/0154984 A1 | 5/2024 | Friedlander et al. |
| 2024/0154995 A1 | 5/2024 | Schwartz et al. |
| 2024/0250967 A1 | 7/2024 | Gitelman et al. |
| 2024/0256979 A1 | 8/2024 | Hanetz et al. |
| 2024/0372562 A1 | 11/2024 | Cooper et al. |
| 2024/0414182 A1 | 12/2024 | Friedlander et al. |
| 2024/0414187 A1 | 12/2024 | Izrael et al. |
| 2025/0036748 A1 | 1/2025 | Shoham et al. |
| 2025/0062777 A1 | 2/2025 | Cooper et al. |
| 2025/0133106 A1 | 4/2025 | Hasan |
| 2025/0205879 A1 | 6/2025 | Cristache |
| 2025/0231555 A1 | 7/2025 | Friedlander et al. |
| 2025/0232042 A1 | 7/2025 | Akoune et al. |
| 2025/0247391 A1 | 7/2025 | Ladelsky Lellouch et al. |
| 2025/0260703 A1 | 8/2025 | Luk-Zilberman et al. |

FOREIGN PATENT DOCUMENTS

| | | | |
|---|---|---|---|
| CN | 102833271 | A | 12/2012 |
| CN | 103368979 | A | 10/2013 |
| CN | 103812861 | A | 5/2014 |
| CN | 103874069 | A | 6/2014 |
| CN | 104426906 | A | 3/2015 |
| CN | 104520871 | A | 4/2015 |
| CN | 105554009 | A | 5/2016 |
| CN | 106462531 | A | 2/2017 |
| CN | 106846806 | A | 6/2017 |
| CN | 107743108 | A | 2/2018 |
| CN | 108632279 | A | 10/2018 |
| CN | 108780479 | A | 11/2018 |
| CN | 108885659 | A | 11/2018 |
| CN | 108900476 | A | 11/2018 |
| CN | 109063745 | A | 12/2018 |
| CN | 109246685 | A | 1/2019 |
| CN | 110115015 | A | 8/2019 |
| CN | 110502677 | A | 11/2019 |
| CN | 110583003 | A | 12/2019 |
| CN | 110661759 | A | 1/2020 |
| CN | 111091068 | A | 5/2020 |
| CN | 107667505 | B | 12/2020 |
| CN | 112019494 | A | 12/2020 |
| CN | 112560045 | A | 3/2021 |
| CN | 112802086 | A | 5/2021 |
| CN | 114255830 | A | 3/2022 |
| CN | 114270347 | A | 4/2022 |
| EP | 3111614 | A1 | 1/2017 |
| EP | 3154242 | A1 | 4/2017 |
| EP | 3220595 | A1 | 9/2017 |
| EP | 3349414 | A1 | 7/2018 |
| EP | 3442164 | A1 | 2/2019 |
| EP | 3451219 | A1 | 3/2019 |
| EP | 3745291 | A1 | 12/2020 |
| EP | 3896543 | A1 | 10/2021 |
| EP | 3948600 | A1 | 2/2022 |
| JP | 2012-222461 | A | 11/2012 |
| JP | 5301669 | B2 | 9/2013 |
| JP | 2018-521430 | A | 8/2018 |
| JP | 2019-179395 | A | 10/2019 |
| KR | 10-0974888 | B1 | 8/2010 |
| RU | 124102 | U1 | 1/2013 |
| RU | 2750554 | C2 | 6/2021 |
| WO | 2013/075890 | A1 | 5/2013 |
| WO | 2014/128253 | A1 | 8/2014 |
| WO | 2015/113036 | A1 | 7/2015 |
| WO | 2016/196820 | A1 | 12/2016 |
| WO | 2017/127850 | A1 | 7/2017 |
| WO | 2018/057945 | A1 | 3/2018 |
| WO | 2018/071845 | A1 | 4/2018 |
| WO | 2018/080975 | A1 | 5/2018 |
| WO | 2018/080976 | A1 | 5/2018 |
| WO | 2018/182442 | A1 | 10/2018 |
| WO | 2018/213205 | A1 | 11/2018 |
| WO | 2019/064237 | A1 | 4/2019 |
| WO | 2019/164484 | A1 | 8/2019 |
| WO | 2020/005258 | A1 | 1/2020 |
| WO | 2020/093020 | A1 | 5/2020 |
| WO | 2020/124037 | A1 | 6/2020 |
| WO | 2020/136635 | A1 | 7/2020 |
| WO | 2020/141486 | A1 | 7/2020 |
| WO | 2020/205258 | A1 | 10/2020 |
| WO | 2021/105995 | A1 | 6/2021 |
| WO | 2022/103630 | A1 | 5/2022 |

OTHER PUBLICATIONS

Harisha Guna, Pankaj Kumar, Anshu Sinha; Cisco TAC Engineer(s). Cisco. "DHCP Parameter Request List Option 55 Used to Profile Endpoints Configuration Example" Updated: Feb. 3, 2021.
Dufka, "Comparison of Machine Learning Methods for Operating System Identification," Masaryk University Thesis, 2018, retrieved from https://is.muni.cz/th/wmu8d/thesis.pdf.
Yu, et al., "Wdmti: wireless device manufacturer and type identification using hierarchical dirichlet process," 2018 IEEE 15th

(56)　　　　References Cited

OTHER PUBLICATIONS

International Conference on Mobile Ad Hoc and Sensor Systems, pp. 19-27, Oct. 2018.

International Search Report and Written Opinion from PCT/IB2023/052802, dated Jun. 22, 2023, 9 pages.

Peter J. Rousseeuw and Katrien Van Driessen. "A Fast Algorithm for the Minimum Covariance Determinant Estimator". Technometrics, 1999. pp. 212-223. vol. 41.3. U.S.

Rihan et al. Abnormal Network Traffic Detection based on Clustering and Classification Techniques: DoS Case Study, A Thesis Submitted in Partial Fulfillment of the Requirement for the Degree of Master in Information Technology https://library.iugaza.edu.ps/thesis/110094.pdf (Year: 2013).

Rohani, A., Taki, M., & Abdollahpour, M. (2018). A novel soft computing model (Gaussian process regression with K-fold cross validation) for daily and monthly solar radiation forecasting (Part: I). In Renewable Energy (vol. 115, pp. 411-422). Elsevier BV. https://doi.org/10.1016/j.renene.2017.08.061 (Year: 2017).

Safi et al., "A Survey on IoT Profiling, Fingerprinting, and Identification", ACM Transactions on Internet of Things, Jan. 1, 1990, pp. 1-39.

Scikit Learn. "3.3. Metrics and scoring: quantifying the quality of predictions" Accessed Jun. 30, 2021. https://scikit-learn.org/stable/modules/model_evaluation.html.

Seraphin B. Calo • Dinesh Verma • Maroun Touma • Franck Le • Douglas Freimuth • Erich Nahum; An AI Enabled System for Distributed System Characterization; 2019 IEEE International Conference on Cognitive Computing (ICCC) (2019, pp. 10-18); (Year: 2019).

Splunk Machine Learning Tool Kit User Guide. "Scoring metrics in the Machine Learning Toolkit" Accessed Jun. 30, 2021. https://docs.splunk.com/Documentation/MLApp/5.2.1/User/ScoreCommand.

Stack Overflow. "Overlay normal curve to histogram in R". Accessed Jun. 30, 2021. https://stackoverflow.com/questions/20078107/overlay-normal-curve-to-histogram-in-r.

Tahreem Yaqoob, Haider Abbas, Security Vulnerabilities, Attacks, Countermeasures, and Regulations of Networked Medical Devices, IEEE Communications Surveys & Tutorials, vol. 21, No. 4, Fourth Quarter 2019, 46 pages (Year: 2019).

Tom Mahler, A New Methodology for Information Security Risk Assessment for Medical Devices and Its Evaluation, The Department of Software and Information Systems Engineering (SISE), Ben-Gurion University of the Negev, Israel, 24 pages (Year: 2020).

Travis' Blog random snippets and information. "Histogram with normal distribution overlay in Excel". Accessed Jun. 30, 2021. https://thydzik.com/histogram-with-normal-distribution-overlay-in-excel/.

Wazen M. Shbair et al "A Multi-Level Framework to Identify HTTPS Services". 2016 IEEE/IFIP Network Operations and Management Symposium (NOMS 2016).

Wenchao Cui and Minghao Gou "Design and Implementation of a SSH Proxy System Based on B/S Architecture" 2021 J. Phys.: Conf. Ser. 2010 012020.

Williams et al., "Cybersecurity vulnerabilities in medical devices: a complex environment and multifaceted problem", 2015, eHealth Research Group and Security Research Institute, Edith Cowan University, Perth, WA, Australia Correspondence: School of Computer and security (Year: 2015).

Xu, S.: "Politecnico Di Milano Machine Learning Techniques for Fault Detection in Chemical Processes, The Tennessee Eastman Process case study", Dec. 31, 2019.

Yu, et al., "You Are What You Broadcast: Identification of Mobile and IoT Devices from (Public) Wifi," USENIX Security Symposium, Aug. 2020, pp. 55-72.

Zhang et al., "Network Anomaly Detection Based on Cooperative Semi-Supervised Support Vector Machine," 2019 International Conference on Networking and Network Applications (NaNA) Year: 2019 | Conference Paper | Publisher: IEEE.

Zhang, et al., "Active balancing mechanism for imbalanced medical data in deep learning-based classification models," ACM Transactions on Multimedia Computing, Communications and Applications (TOMM), Mar. 2020, retrieved from https://dl.acm.org/doi/pdf/10.1145/3357253 (Year: 2020).

Abdalla. H. S. et al., "Iot device identification via network-flow based fingerprinting and learning", In 2019 18th IEEE international conference on trust, security and privacy in computing and communications/13th IEEE international conference on big data science and engineering (TrustCom/BigDataSE), Aug. 31, 2019, pp. 103-111.

Aechan Kim • Mohyun Park • Dong Hoon Lee: AI-IDS: Application of Deep Learning to Real-Time Web Intrusion Detection; IEEE Access (vol. 8, 2020, pp. 70245-70261); (Year: 2020).

Ajay Sreenivasulu, "Evaluation of cluster based anomaly detection", XP093293599, 2019, 28 pages.

Alsuwaidi et al., "Security Vulnerabilities Detected in Medical Devices", 12th Annual Undergraduate Research Conference on Applied Computing (URC2020), United Arab Emirates University, College of IT, Department of Information Systems and Security, 6 pages (Year: 2020).

Amin et al., "CADENCE: Conditional Anomaly Detection for Events Using Noise-Contrastive Estimation", Proceedings of the 12th ACM Workshop on Artificial Intelligence and Security, Nov. 11, 2019.

Andzinski et al. Anomaly detection in DNS traffic, Clustering-based approach, Nov. 5, 2019, https://www.icann.org/sites/default/files/packages/ids-2019/05-andzinski-anomaly-detection-in-dns-traffic-11may19-en.pdf.

Ang Cui et al., "When Firmware Modifications Attack: A Case Study of Embedded Exploitation", Jan. 1, 2013, XP055711221, DOI: 10.7916/D8P55NKB, Retrieved from the Internet: URL:https://web.archive.org/web/20150926051553if_/http://ids.cs.columbia.edu/sites/default/files/ndss-2013.pdf.

Anna L. Buczak • Erhan Guven; A Survey of Data Mining and Machine Learning Methods for Cyber Security Intrusion Detection; IEEE Communications Surveys & Tutorials (vol. 18, Issue: 2, 2016, pp. 1153-1176); (Year: 2016).

Anonymous authors. "Neural Networks with Block Diagonal Inner Product Layers". https://openreview.net/pdf?id=Hyl5ro0pW. 2018.

Anonymous: "Recovery", Nov. 20, 2019, pp. 1-16, XP093108397, Retrieved from the Internet on Dec. 4, 2024: URL: https://web.archive.org/web/20191120050356/https://hack-technicolor.readthedocs.io/en/stable/Recovery/.

ArcGIS for Desktop. "Overlay analysis" Accessed Jun. 30, 2021. https://desktop.arcgis.com/en/arcmap/10.3/analyze/commonly-used-tools/overlay-analysis.htm.

Breck, et al., "Data Validation for Machine Learning," MLSys, Dec. 31, 2019, retrieved from https://proceedings.misys.org/book/2019/file/5878a7ab84fb43402106c575658472fa- Paper.pdf.

Brokmeier, Pascal, "An Overview of Categorical Input Handling for Neural Networks", Towards Data Science, Jan. 15, 2019.

Chandola, et al., "Anomaly Detection: A Survey". ACM Computing Surveys, vol. 41, No. 3, Article 15, 2009, pp. 1-72.

Cieslak, D. A. et al., "Detecting Fractures in Classifier Performance", Data Mining, 2007, Icdm 2007, Seventh Ieee International Conference on, IEEE, Oct. 28, 2007, pp. 123-132.

Creager, "How can anomalous IoT device activity be detected?," Jul. 17, 2018, retrieved from https://www.techtarget.com/iotagenda/blog/IoT-Agenda/How-can-anomalous-IoT-device-activity-be-detected, 3 pages.

Cvitic, Ivan, et al. "Ensemble machine learning approach for classification of IoT devices in smart home." International Journal of Machine Learning and Cybernetics 12.11 (2021): 3179-3202. (Year: 2021).

Daniel Minoli • Benedict Occhiogrosso; Current and Evolving Applications to Network Management; Wiley-IEEE Press 2023 (Edition : 1); (Year: 2023).

Daniel Wood, Cleartext Data Transmissions in Consumer IoT Medical Devices, IoT S&P'17, Nov. 3, 2017, Dallas, TX, USA, pp. 7-12 (Year: 2017).

David Zaldivar, Investigating the Security Threats on Networked Medical Devices, Published in: 2020 10th Annual Computing and Communication Workshop and Conference (CCWC), Date of Conference: Jan. 6-8, 2020, 6 pages (Year: 2020).

(56) References Cited

OTHER PUBLICATIONS

Deng et al., Sparse Support Vector Machine for Network Behavior Anomaly Detection, 2020 IEEE 8th International Conference on Information, Communication and Networks (ICICN) Year: 2020 | Conference Paper | Publisher: IEEE.

Emma McMahon, Assessing medical device vulnerabilities on the Internet of Things, Published in: 2017 IEEE International Conference on Intelligence and Security Informatics (ISI), Date of Conference: Jul. 22-24, 2017, 3 pages (Year: 2017).

Feng, Wenbo, et al. "Network protocol recognition based on convolutional neural network." China Communications 17.4 (2020): 125-139. (Year: 2020).

File history and references cited therein of U.S. Appl. No. 17/932,163, filed Sep. 14, 2022, published Mar. 14, 2024, as U.S. Publication No. US20240089277A1.

File History and the references cited therein of corresponding U.S. Appl. No. 17/483,360, filed Sep. 23, 2021, issued Jul. 30, 2024 as U.S. Pat. No. 12,052,274 B2.

File History and the references cited therein of U.S. Appl. No. 17/188,879, filed Mar. 1, 2021, published Sep. 1, 2022 as U.S. Publication No. US20220278984A1.

File history and the references cited therein of U.S. Appl. No. 16/715,464, filed Dec. 16, 2019, issued Apr. 9, 2024 as U.S. Pat. No. 11,956,252 B2.

File history and the references cited therein of U.S. Appl. No. 16/801,748, filed Feb. 26, 2020, issued Feb. 12, 2023 as U.S. Pat. No. 11,841,952 B2.

File history and the references cited therein of U.S. Appl. No. 17/821,914, filed Aug. 24, 2022, published Dec. 29, 2022 as U.S. Publication No. 2022-0414230 A1.

File history and the references cited therein of U.S. Appl. No. 18/597,947, filed Mar. 7, 2024, published Jul. 25, 2024 as U.S. Publication No. US20240250967A1.

Gama, J. et al., "Learning with Drift Detection" In: "Learning with Drift Detection", Jan. 1, 2004, XP055657564, vol. 3171, pp. 286-295.

Gnanaprakasam Pandian, Security Challenges of IoT and Medical Devicesin Healthcare, Book: Internet of Things, Edition: 1st Edition, 20 pages (Year: 2020).

Hershey et al., Approximating the Kullback Leibler Divergence Between Gaussian Mixture Models, IBM T.J. Watson Research Center, IEEE 2007, pp. 317-320 (Year: 2007).

Ian Stine, A cyber risk scoring system for medical devices, International Journal of Critical Infrastructure Protection vol. 19, Dec. 2017, pp. 32-46 (Year: 2017).

International Preliminary Report on Patentability received for PCT Patent Application No. PCT/IB23/052802, mailed on Oct. 3, 2024, 7 pages.

Jake Beavers, Sina Pournouri, Recent Cyber Attacks and Vulnerabilities in Medical Devices and Healthcare Institutions, Apr. 9, 2019, Part of the Advanced Sciences and Technologies for Security Applications book series (ASTSA), https://link.springer.com/chapter/10.1007/978-3-030-11289-9_11 (Year: 2 019).

Jibran Saleem; A state of the art survey—Impact of cyber aacks on SME's; ACM:2017; pp. 1-7.

Joao, G. et al., "On evaluating stream learning algorithms", Machine Learning, vol. 90, No. 3, Oct. 24, 2012, pp. 317-346.

Johnson, Daniel. "NLTK Tokenize: Words and Sentences Tokenizer with Example". Updated Mar. 8, 2022. https://www.guru99.com/tokenize-words-sentences-nltk.html.

Kumar, Ajitesh, "Machine Learning—Training, Validation & Test Data Set", retrieved on Jun. 13, 2021. Retrieved fromhttps://web.archive.org/web/20210728064012/https://vitalflux.com/machine-learning-training-validation-test-data-set/.

Kuncheva, Ludmila I., and Juan J. Rodriguez. "A weighted voting framework for classifiers ensembles." Knowledge and information systems 38.2 (2014): 259-275. (Year: 2014).

Lamba, et al., "Mitigating Cyber Security Threats of Industrial Control Systems (Scada & DCS)," International Journal for Technological Research in Engineering, 2017, pp. 31-34.

Li, Qianmu; Meng, Shunmei; Zhang, Sainan; Wu, Ming; Zhang, Jing; Ahvanooey, Milad Taleby; Aslam, Muhammad Shamrooz; Safety Risk Monitoring of Cyber-Physical Power Systems Based on Ensemble Learning Algorithm; IEEE Access (vol. 7, pp. 24788-24805); (Year: 2019).

Liu, et al., "Isolation Forest" 2008 Eight IEEE International Conference on Data Mining, 2009, pp. 413-422.

Markus, M., et al., "IoT Sentinel Demo: Automated Device-Type Identification for Security Enforcement in IoT", Proceedings of the International Conference on Distributed Computing Systems, IEEE Computer Society, Jun. 5, 2017, pp. 2511-2514.

Martin, et al., "Decomposition of MAC Address Structure for Granular Device Inference," ACSAC, 2016, Los Angeles, CA, pp. 78-88.

Mohamed Abomhara; Cyber Security and the Internet of Things: Vulnerabilities, Threats, Intruders and Attacks; University of Agder, Norway; year: 2015; pp. 1-24.

Noguchi, Hirofumi, Misao Kataoka, and Yoji Yamato. "Device identification based on communication analysis for the internet of things." IEEE Access 7 (2019): 52903-52912. (Year: 2019).

Pandian, "Security Challenges of IoT and Medical Devices in Healthcare," Internet of Things, 1st Edition, 2020, Chapter 6, pp. 87-106.

Peltier Tech: Peltier Technical Services—Excel Charts and Programming. "Histogram With Normal Curve Overlay". Accessed Jun. 30, 2021. https://peltiertech.com/histogram-normal-curve-overlay/.

* cited by examiner

SYSTEM AND METHOD FOR DEVICE ATTRIBUTE IDENTIFICATION BASED ON HOST CONFIGURATION PROTOCOLS

TECHNICAL FIELD

The present disclosure relates generally to identifying device attributes such as operating system for use in cybersecurity for network environments, and more specifically to identifying device attributes using host configuration protocols.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to ensuring that appropriate mitigation actions are taken.

The challenge involved with profiling a user device is magnified by the fact there is no industry standard for querying or obtaining information from user devices. This challenge is particularly relevant when attempting to determine device attributes. As new types of devices come out frequently and there is not a single uniform standard for determining device attributes in data sent from these devices, identifying the attributes of devices accessing a network environment is virtually impossible.

More specifically, as device data is obtained from various sources, device attributes such as operating system may be absent or conflicting in data from the various sources. For example, this may be caused by partial visibility over network traffic data due to deployment considerations, partial coverage due to sampled traffic data as opposed to continuously collected traffic data, continuous and incremental collection of device data over time, and conflicting data coming from different sources.

The traffic data available between clients and servers may contain host configuration protocol data in the form of packets. An example of such a host configuration protocol is Dynamic Host Configuration Protocol (DHCP), which allows a server to dynamically distribute Internet Protocol (IP) address and configuration data to clients. When a client becomes configured to begin communicating subject to DHCP, the client sends a DHCP discovery packet identifying itself. The server returns a DHCP offer packet to the client. The client, in turn, responds to the DHCP offer packet with a DHCP request packet to verify the offered address. The server sends a pack packet, thereby completing the initialization sequence. When the client sends a discover or request packet, the packet typically includes a list of one or more DHCP options.

Solutions for ensuring complete and accurate device attribute data are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining device attributes based on host configuration protocols. The method comprises: applying at least one machine learning model to a test data set extracted from host configuration protocol data including at least one test options sequence, wherein each test options sequence is an ordered series of options requested by a first device, wherein each of the at least one machine learning model is trained based on a train data set including a plurality of training options sequences and a plurality of device attributes, wherein each training options sequence and each device attribute of the train data set corresponds to a respective second device; and determining, based on the output of the at least one machine learning model, at least one device attribute for the first device.

Certain embodiments disclosed herein also include a non-transitory computer readable medium having stored thereon causing a processing circuitry to execute a process, the process comprising: applying at least one machine learning model to a test data set extracted from host configuration protocol data including at least one test options sequence, wherein each test options sequence is an ordered series of options requested by a first device, wherein each of the at least one machine learning model is trained based on a train data set including a plurality of training options sequences and a plurality of device attributes, wherein each training options sequence and each device attribute of the train data set corresponds to a respective second device; and determining, based on the output of the at least one machine learning model, at least one device attribute for the first device.

Certain embodiments disclosed herein also include a system for determining device attributes based on host configuration protocols. The system comprises: a processing circuitry; and a memory, the memory containing instructions that, when executed by the processing circuitry, configure the system to: apply at least one machine learning model to a test data set extracted from host configuration protocol data including at least one test options sequence, wherein each test options sequence is an ordered series of options requested by a first device, wherein each of the at least one machine learning model is trained based on a train data set including a plurality of training options sequences and a plurality of device attributes, wherein each training options sequence and each device attribute of the train data set corresponds to a respective second device; and determine, based on the output of the at least one machine learning model, at least one device attribute for the first device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
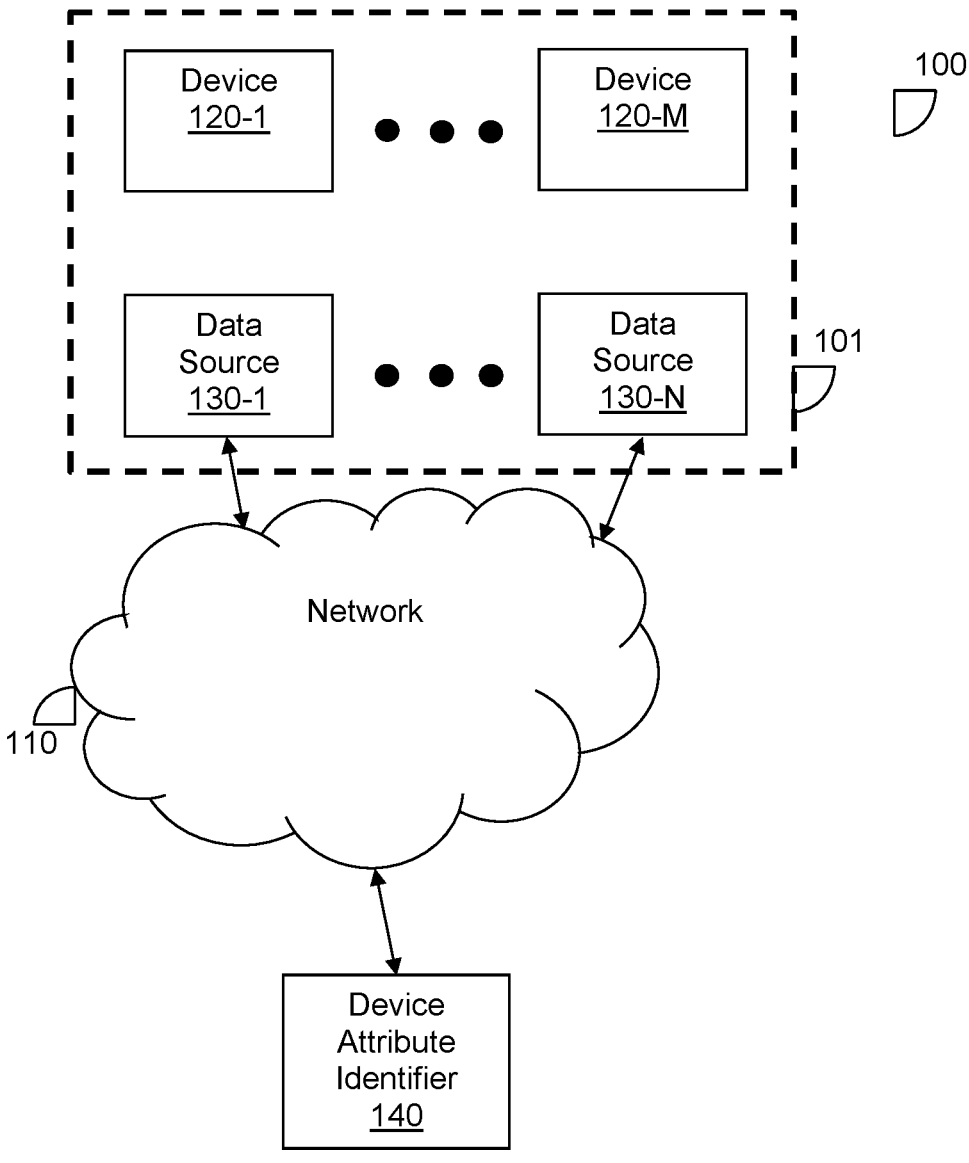
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that device attributes, particularly operating system used by the device, can be identified with a high degree of accuracy using data related to host configuration protocols (e.g., the Dynamic Host Configuration Protocol standard defined by RFC 1541). More specifically, it has been identified that the fields used for requesting parameters in certain host configuration protocol packets (such as DHCP Parameter Request List option 55) demonstrate patterns which can be leveraged in order to identify a device's operating system.

These patterns appear at least in the order by which the client requests options via the Parameter Request List field in the DHCP option 55 packet. To this end, it is noted that, when a device sends a discover or request packet for certain types of host configuration protocols such as DHCP, the device includes a list of options (e.g., DHCP options) which the device intends to receive from the server to which the packet is sent. The order by which the client requests these options from the server is unique and can be used to fingerprint a particular operating system.

It has further been identified that, although a rules-based mechanism defining certain predetermined patterns to look for when analyzing traffic could be used, such a rules-based mechanism would not provide suitable reliability due to variations in patterns that may occur. Specifically, relying on a rules-based mechanism would yield unreliable predictions with low coverage rates. Further, such a rules-based mechanism would require manual definitions, tuning, and maintenance, which would hinder procedural scalability.

Accordingly, the disclosed embodiments provide techniques for identifying device attributes such as operating system using host configuration protocol data such as data in the Parameter Request List field in DHCP option 55 packets. The disclosed embodiments further provide techniques to improve device attribute identification using machine learning. The disclosed embodiments therefore provide techniques for identifying device attributes using machine learning that demonstrate higher reliability and scalability than manual techniques. Also, various disclosed embodiments provide specific techniques for improving the accuracy of the machine learning process in the context of device attribute identification using host configuration protocol data. Such techniques include techniques for normalizing, filtering, and grouping the data that yield better tuned machine learning models when used for training, which in turn improves the accuracy of device attributes determined using outputs of the machine learning models.

In various disclosed embodiments, predictions of device attributes using the trained machine learning model are used to monitor device activity in order to detect abnormal behavior which may be indicative of cybersecurity threats. To this end, the determined device attributes may be added to device profiles for devices and used in accordance with device normal behaviors of devices having certain combinations of device attributes in order to identify potentially abnormal behavior. When abnormal behavior is detected, mitigation actions may be performed in order to mitigate potential cybersecurity threats. Due to the improved machine learning noted above, using device attributes determined as described herein further allows for more accurately identifying and mitigating potential cybersecurity threats, thereby improving cybersecurity for networks in which such devices operate.

FIG. 1 shows an example network diagram 100 utilized to describe the various disclosed embodiments. In the example network diagram 100, data sources 130-1 through 130-N (hereinafter referred to as a data source 130 or as data sources 130) communicate with a device attribute identifier 140 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The data sources 130 are deployed such that they can receive data from systems deployed in a network environment 101 in which devices 120-1 through 120-M (referred to as a device 120 or as devices 120) are deployed and communicate with each other, the data sources 130, other systems (not shown), combinations thereof, and the like. The data sources 130 may be, but are not limited to, databases, network scanners, both, and the like. Data collected by or in the data sources 130 may be transmitted to the device attribute identifier 140 for use in determining device attributes as described herein. To this end, such data includes protocol strings indicating at least protocols used to send the strings and keys for encrypting data pursuant to an IP session in which the strings are sent.

Each of the devices 120 may be, but is not limited to, a personal computer, a laptop, a tablet computer, a smartphone, a wearable computing device, or any other device capable of receiving and displaying notifications. Each device 120 may utilize a communications protocol which may be indicated in data transmitted by the device 120 such that communications by the device 120 are formatted in accordance with string conventions defined by that protocol. As discussed herein, such protocols define requirements for inclusion of protocol and key data which may be utilized to determine device attributes for each of the devices 120.

The device attribute identifier 140 is configured to determine device attributes of the devices 120 based on host configuration protocol data obtained from the data sources 130. More specifically, the device attribute identifier 140 is configured to apply one or more machine learning models trained to predict device attributes such as operating systems as described herein.

During a training phase, the machine learning models are trained using training data obtained by reading device and host configuration data files. In particular, the data obtained by reading device and host configuration data files includes at least options data sent in packets by the device during initialization of a host configuration protocol such as DHCP. As noted above, it has been identified that the order in which options are sent (e.g., an order of an options list) strongly correlates to devices of certain types and, in particular, devices using certain operating systems for communications with a server. In a further embodiment, the options data includes DHCP option 55 data.

Data to be used for training and applying the machine learning models is obtained and processed. The processing may include, but is not limited to, normalizing device attributes indicated therein, grouping such device attributes, filtering device, extracting features (e.g., request parameter frequencies), normalizing such features, combinations thereof, and the like. The processing may further include splitting the data into disjoint train and test data sets, where the train data set is used to train the machine learning models and the trained models are applied to the test data set.

It should be noted that the device attribute identifier 140 is depicted as being deployed outside of the network environment 101 and the data sources 130 are depicted as being deployed in the network environment 101, but that these depictions do not necessarily limit any particular embodiments disclosed herein. For example, the device attribute identifier 140 may be deployed in the network environment 101, the data sources 130 may be deployed outside of the network environment 101, or both.

Figure 2:
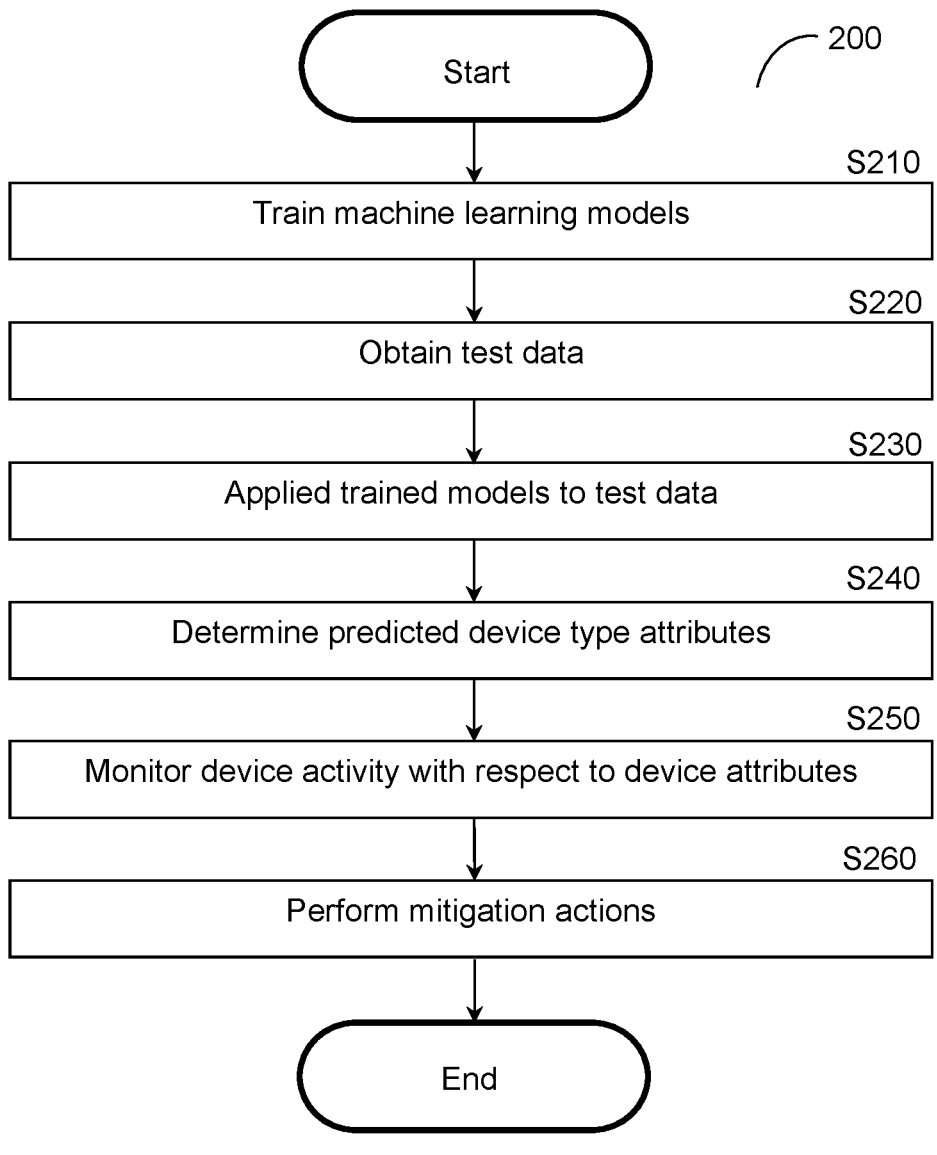
FIG. 2 is a flowchart illustrating a method for securing a network environment by identifying device attributes based on host configuration protocol data according to an embodiment.

FIG. 2 is an example flowchart 200 illustrating a method for securing a network environment by identifying device attributes based on host configuration protocols according to an embodiment. In an embodiment, the method is performed by the device attribute identifier 140, FIG. 1.

At S210, one or more machine learning models are trained to yield predictions of device attributes based on host configuration protocol data. In an embodiment, each machine learning model is a classifier trained to output, for each sequence of options sent by a device, probabilities for respective classes. Each class, in turn, may correspond to a label representing a device attribute (e.g., a particular operating system).

Figure 3:
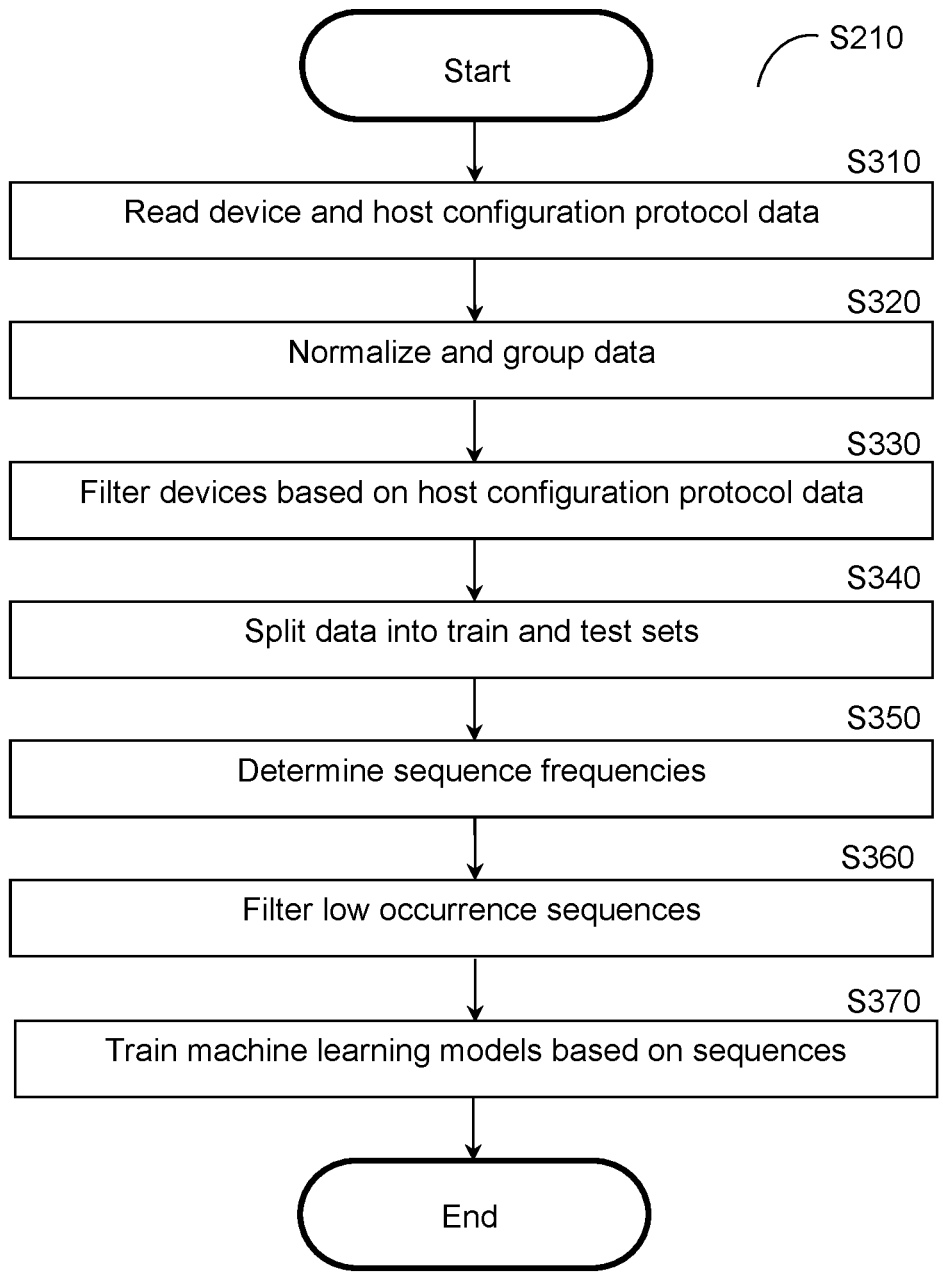
FIG. 3 is a flowchart illustrating a method for training machine learning models to determine device attributes based on host configuration protocol data according to an embodiment.

In an embodiment, the machine learning models are trained using a process as depicted with respect to FIG. 3. FIG. 3 is a flowchart S210. illustrating a method for training machine learning models to determine device attributes based on host configuration protocol data according to an embodiment.

At S310, device and host configuration protocol data are read. The data may be read from packets sent, for example, during an initiation sequence (e.g., the initiation sequence for DHCP communications). In accordance with various disclosed embodiments, the data that is read includes packets or portions of packets (e.g., the Parameter Request List field in a DHCP packet) including an ordered sequence of options. As noted above, specific orders of options tend to correspond to particular operating systems such that they can be leveraged to predict operating systems or other device attributes.

At S320, the data read at S310 is normalized and grouped. The normalization may include, but is not limited to, cleaning data, data type normalization, formatting normalization, combinations thereof, and the like. In an embodiment, device attribute values indicated in the data may be normalized.

In an embodiment, at least a portion of the data may be grouped. More specifically, during a training phase, data may be grouped with respect to device attributes such that data including device attribute values may be grouped into groups of device data indicating the same device attributes. For example, device data may be grouped with respect to operating systems. In some embodiments, data may be grouped into an "OTHER" group. For example, the "OTHER" group may include data having device attributes that are absent from a whitelist of device attributes. During a prediction phase, predictions may be yielded for each device individually.

At S330, devices represented in the data are filtered based on host configuration protocol data. The filtering may be performed to remove or otherwise regroup data to be used for training learning models to be used for determining predicted device attributes, thereby further improving the accuracy of device attribute inferences made using those models. In an embodiment, devices for which there is host configuration protocol data is missing may be filtered out. As a non-limiting example, devices for which DHCP request parameters data is absent in the host configuration protocol data are filtered out.

At S340, the data is split into train and test sets. In an embodiment, S340 may include sampling the data. As a non-limiting example, stratified sampling may be applied such that each class (e.g., each device attribute) is represented in both the train and test sets in accordance with its overall frequency within the population.

At S350, a frequency is determined for each options sequence with respect to each device attribute. In an embodiment, each determined frequency is a ratio in which each sequence was observed for each device attribute as compared to the total number of instances of the sequence over different possible device attributes (e.g., over all operating systems).

As a non-limiting example, the device attributes include a first operating system "opSys-A" and a second operating system "opSys-B", and options sequences included in data for devices include the following:

Sequence 1: optA, optB, optC

Sequence 2: optX, optY, optZ

In this example, optA, optB, optC, optX, optY, and optZ are different options sent in sequential order. When sequences for device data for sequence 1 include 80 instances over "opSys-A" and 20 instances over "opSys-B," the frequencies for sequence 1 with respect to operating system "opSys-A" and "opSys-B" are 0.8 and 0.2, respectively.

At S360, low occurrence sequences are filtered out from the train data set in order to create a filtered train data set. The low occurrence sequences may include, but are not limited to, sequences that were observed (i.e., included in the data) less than a threshold number of times, sequences that were observed below a threshold proportion of total sequences for a given device attribute, or both. The threshold proportion of total sequences applied to each sequence may be defined with respect to a device attribute (e.g., a particular operating system) for which the sequence had the highest determined frequency. This filtering ensures significance of the data used for training the models and minimizes false positives.

In this regard, it is noted that a given options sequence may correspond to more than one device attribute (e.g., more than one operating system). By determining a proportion of a given sequence for the device attribute having the highest frequency for the sequence and filtering based on this determined proportion, only the most uniquely identifying sequence-attribute correlations are used to train the models, thereby improving the models and, consequently, improving device attribute predictions made using model outputs.

At S370, one or more machine learning models are trained based at least on the options sequences and device attribute values included in the train set. Each model is configured to output one or more probabilities, with each probability corresponding to a respective class representing a device attribute. Since the models are trained using options sequences and device attribute values, the models allow for learning correlations between option sequences and particular device attributes.

Returning to FIG. 2, at S220, test data is obtained. In an embodiment, the test data may be included in traffic data and split from training data as described above with respect to S340. Alternatively or collectively, the test data may be new data obtained by observing packets sent by devices in a network environment.

In an embodiment, the test data may be preprocessed before applying the machine learning models to the test data. Such preprocessing may include, but is not limited to, extracting features to which the machine learning models will be applied. The extracted features may include, but are not limited to, data extracted from certain fields in packets (for example, the Parameter Request List field in a DHCP option 55 packet).

At S230, the trained machine learning models are applied to the test data in order to yield predictions of device attributes. In an embodiment, the machine learning models are each trained to output scores corresponding to different potential device attributes. In a further embodiment, each model may output multiple scores (i.e., scores for different potential device attributes) for each sequence of options sent by each device.

At S240, based on the output of the machine learning models, one or more predicted device attributes are determined (i.e., for one or more respective devices whose data is included in the test data).

In an embodiment, the machine learning models output a probability for each class among multiple potential classes, where each class represents a potential device attribute. For example, a machine learning model may be trained to output respective probabilities for various operating systems. In a further embodiment, the machine learning models may output multiple probabilities for a given device, for example, a probability for each sequence of options included in packets sent by to the device (e.g., an order of options sent in packets by the device during an initiation sequence).

In yet a further embodiment, the predicted device attribute is a device attribute corresponding to a class having the highest probability after averaging probabilities over multiple device sequences for the device. Moreover, in some embodiments, only classes having respective probabilities above a threshold are used to determine predicted device attributes. Different thresholds may be set for different classes (e.g., for different operating systems).

At S250, device activity of one or more devices is monitored for abnormal behavior based on the determined device attributes.

In an embodiment, S250 includes adding the device attributes to respective profiles of devices for which the device attributes were determined and monitoring the activity of those devices based on their respective profiles. In such an embodiment, one or more policies define allowable behavior for devices having different device attributes such that, when a device having a certain device attribute or combination of device attributes deviates from the behavior indicated in the policy for that device attribute, the device's current behavior can be detected as abnormal and potentially requiring mitigation. The policy may be defined based on previously determined profiles including known device behavior baselines for respective devices. In a further embodiment, normal behavior patterns with respect to certain combinations of device attributes may be defined manually or learned using machine learning, and S250 may include monitoring for deviations from these normal behavior patterns.

At S260, one or more mitigation actions are performed in order to mitigate potential cyberthreats detected as abnormal behavior at S250. The mitigation actions may include, but are not limited to, severing communications between a device and one or more other devices or networks, generating an alert, sending a notification (e.g., to an administrator of a network environment), restricting access by the device, blocking devices (e.g., by adding such devices to a blacklist), combinations thereof, and the like. In some embodiments, devices having certain device attributes may be blacklisted such that devices having those device attributes are disallowed, and the mitigation actions may include blocking or severing communications with devices having the blacklisted device attributes.

Figure 4:
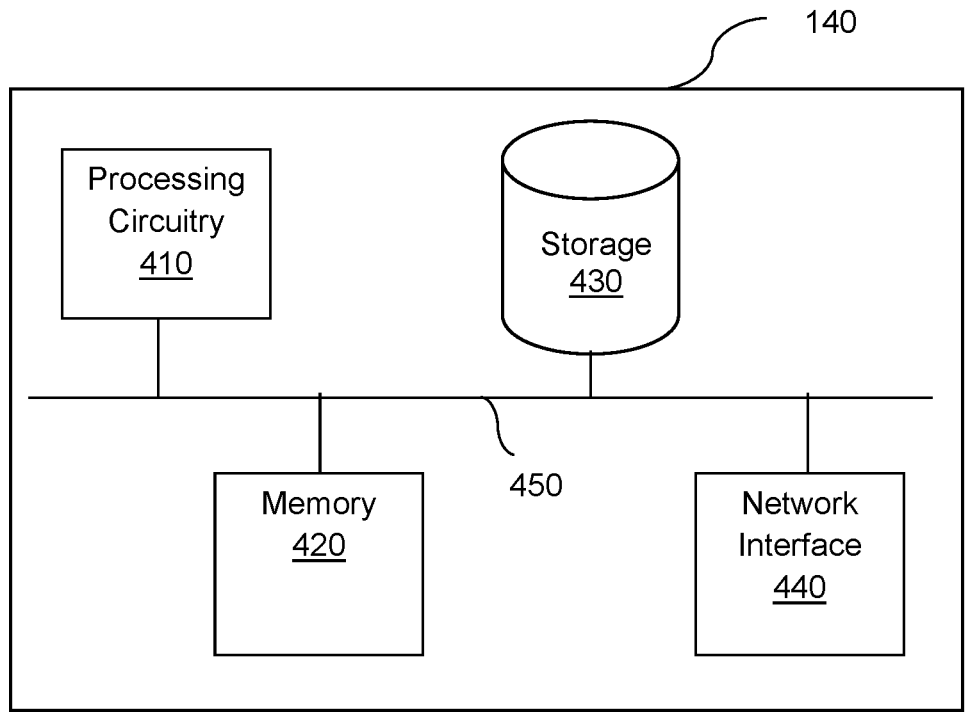
FIG. 4 is a schematic diagram of a device attribute identifier according to an embodiment.

FIG. 4 is an example schematic diagram of a device attribute identifier 140 according to an embodiment. The device attribute identifier 140 includes a processing circuitry 410 coupled to a memory 420, a storage 430, and a network interface 440. In an embodiment, the components of the device attribute identifier 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the device attribute identifier 140 to communicate with, for example, the data sources 130, FIG. 1.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining device attributes based on host configuration protocols, comprising:

applying at least one machine learning model to a test data set extracted from host configuration protocol data including at least one test options sequence, wherein each test options sequence is an ordered series of options included in a Parameter Request List field requested by a first device, wherein each of the at least one machine learning model is trained based on a train data set including a plurality of training options sequences and a plurality of device attributes, wherein each training options sequence and each device attribute of the train data set corresponds to a respective second device, and wherein low occurrence options sequences are filtered out from the plurality of training options sequences of the train data set prior to training the at least one machine learning model, the low occurrence options sequences are training options sequences that were observed in the train data set less than a threshold number of times;

determining, based on an output of the at least one machine learning model, at least one device attribute of the first device;

monitoring activity of the first device with respect to at least one policy corresponding to the determined at least one device attribute of the first device;

detecting at least one abnormal behavior of the first device when the first device deviates from allowable behavior indicated in the at least one policy; and performing one or more mitigation actions on the first device in response to the detected at least one abnormal behavior.

2. The method of claim 1, further comprising:

determining, with respect to each of at least one device attribute, a frequency for each training options sequence of the train data set, wherein each low occurrence options sequence has a proportion of total options sequences below a threshold, wherein the threshold applied to each training options sequence is defined with respect to a device attribute for which each training options sequence has a highest determined frequency.

3. The method of claim 1, wherein the train data set is a second data set, wherein the test data set is a third data set, further comprising:

grouping at least a portion of a first data set with respect to at least one type of device attribute for device data of devices represented in the first data set, wherein the train data set includes the grouped at least a portion of the first data set.

4. The method of claim 3, further comprising:

filtering at least a portion of the first data set having device attribute values that are absent from a predetermined list of device attributes.

5. The method of claim 1, wherein the at least one device attribute determined for the first device includes at least one operating system.

6. The method of claim 1, wherein the series of options of each test options sequence is a series of options indicated in a Parameter Request List field in at least one Dynamic Host Configuration Protocol option 55 packet.

7. The system of claim 1, wherein the at least one device attribute determined for the first device includes at least one operating system.

8. A non-transitory computer readable medium having stored thereon instructions for causing a processing circuitry to execute a process, the process comprising:

applying at least one machine learning model to a test data set extracted from host configuration protocol data including at least one test options sequence, wherein each test options sequence is an ordered series of options included in a Parameter Request List field requested by a first device, wherein each of the at least one machine learning model is trained based on a train data set including a plurality of training options sequences and a plurality of device attributes, wherein each training options sequence and each device attribute of the train data set corresponds to a respective second device, and wherein low occurrence options sequences are filtered out from the plurality of training options sequences of the train data set prior to training the at least one machine learning model, the low occurrence options sequences are training options sequences that were observed in the train data set less than a threshold number of times;

determining, based on an output of the at least one machine learning model, at least one device attribute of the first device;

monitoring activity of the first device with respect to at least one policy corresponding to the determined at least one device attribute of the first device;

detecting at least one abnormal behavior of the first device when the first device deviates from allowable behavior indicated in the at least one policy; and performing one or more mitigation actions on the first device in response to the detected at least one abnormal behavior.

9. A system for determining device attributes based on host configuration protocols, comprising:

a processing circuitry; and a memory, the memory containing instructions that, when executed by the processing circuitry, configure the system to:

apply at least one machine learning model to a test data set extracted from host configuration protocol data including at least one test options sequence, wherein each test options sequence is an ordered series of options included in a Parameter Request List field requested by a first device, wherein each of the at least one machine learning model is trained based on a train data set including a plurality of training options sequences and a plurality of device attributes, wherein each training options sequence and each device attribute of the train data set corresponds to a respective second device, and wherein low occurrence options sequences are filtered out from the plurality of training options sequences of the train data set prior to training the at least one machine learning model, the low occurrence options sequences are training options sequences that were observed in the train data set less than a threshold number of times;

determine, based on an output of the at least one machine learning model, at least one device attribute of the first device;

monitor activity of the first device with respect to at least one policy corresponding to the determined at least one device attribute of the first device;

detect at least one abnormal behavior of the first device when the first device deviates from allowable behavior indicated in the at least one policy; and perform one or more mitigation actions on the first device in response to the detected at least one abnormal behavior.

10. The system of claim 9, wherein the system is further configured to:

determine, with respect to each of at least one device attribute, a frequency for each training options sequence of the train data set, wherein each low occurrence options sequence has a proportion of total options sequences below a threshold wherein the threshold applied to each training options sequence is defined with respect to a device attribute for which each training options sequence has a highest determined frequency.

11. The system of claim 9, wherein the train data set is a second data set, wherein the test data set is a third data set, wherein the system is further configured to:

group at least a portion of a first data set with respect to at least one type of device attribute for device data of devices represented in the first data set, wherein the train data set includes the grouped at least a portion of the first data set.

12. The system of claim 11, wherein the system is further configured to:

filter at least a portion of the first data set having device attribute values that are absent from a predetermined list of device attributes.

13. The system of claim 9, wherein the series of options of each test options sequence is a series of options indicated in a Parameter Request List field in at least one Dynamic Host Configuration Protocol option 55 packet.

* * * * *